United States Patent
Smith et al.

(10) Patent No.: US 8,294,589 B2
(45) Date of Patent: Oct. 23, 2012

(54) REAL TIME RADIOACTIVE TRAINING

(75) Inventors: Tim Smith, Sugar Land, TX (US); Arturo E. Altamirano, Fresno, TX (US); Toshimichi Wago, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 453 days.

(21) Appl. No.: 12/689,033

(22) Filed: Jan. 18, 2010

(65) Prior Publication Data
US 2010/0259405 A1    Oct. 14, 2010

Related U.S. Application Data

(60) Provisional application No. 61/168,047, filed on Apr. 9, 2009.

(51) Int. Cl.
G08B 21/00    (2006.01)
G08B 17/12    (2006.01)
G03B 11/00    (2006.01)
H05B 33/00    (2006.01)

(52) U.S. Cl. ........... 340/686.1; 340/539.13; 340/539.29; 340/572.1; 340/600; 700/115; 250/482.1; 250/484.5; 235/384

(58) Field of Classification Search ............... 340/686.1, 340/600, 539.29
See application file for complete search history.

(56) References Cited

U.S. PATENT DOCUMENTS

| 6,965,314 B2* | 11/2005 | Bohinc, Jr. ............... 340/539.26 |
| 7,012,520 B2 | 3/2006 | Webb, Sr. |
| 7,158,028 B1 | 1/2007 | Ghahramani |
| 7,209,042 B2* | 4/2007 | Martin et al. ............. 340/572.8 |
| 2005/0248456 A1* | 11/2005 | Britton et al. ............ 340/539.29 |
| 2006/0007006 A1* | 1/2006 | Alioto et al. .................. 340/600 |
| 2008/0129493 A1 | 6/2008 | Fuentes et al. |
| 2008/0186166 A1 | 8/2008 | Zhou |

FOREIGN PATENT DOCUMENTS
WO    2004/113947 A1    12/2004
* cited by examiner

*Primary Examiner* — Donnie Crosland
(74) *Attorney, Agent, or Firm* — Michael Flynn; Robin Nava; Charlotte Rutherford

(57) ABSTRACT

A method of and a system for tracking radioactive sources includes at least one RFID tag attached to a radioactive source shield, the shield receiving a radioactive source at a base location, and a TRX-Gamma box for detecting identification information from the RFID tag and sensing a first gamma radiation count from the radioactive source shield. The identification information and the first gamma radiation count are stored and the shield with the radioactive source is transported to a job location where the radioactive source is removed from the shield. At the job location, a check is made that the radioactive source has been returned to the shield by comparing any newly detected identification information with the stored identification information, and by comparing a sensed second gamma radiation count with the first gamma radiation count.

22 Claims, 5 Drawing Sheets

REAL TIME RADIOACTIVE TRAINING

CROSS-REFERENCE TO RELATED APPLICATION

This application is entitled to the benefit of, and claims priority to, provisional patent application Ser. No. 61/168,047 filed Apr. 9, 2009, the entire disclosure of which is incorporated herein by reference.

BACKGROUND OF THE INVENTION

The statements in this section merely provide background information related to the present disclosure and may not constitute prior art.

The present disclosure relates in general to tracking radioactive shield containers and detecting the sources within such containers. The radioactive shields are transported to and from well sites by trucks and transportation containers called overpacks through land and water worldwide. The invention also tracks the truck and overpack through wireless media, the information sent through this wireless media is read by an asset tracking software which has special algorithms developed to read and interpret this data and transform it to give the asset tracking software user information about the position and state of truck, overpack, the source shields and sources.

The disclosure includes an electronic controller equipped with keypad and display to allow authorized users to load and remove the radioactive shield containers with sources from the truck or overpack. The system will load a set of radioactive source shields with sources and will track them while in transport through wireless media which is both cellular and satellite based. While loaded, the source shields and sources can not be removed form the truck or overpack unless and authorized users does so. Once the radioactive shields are removed from the truck or overpack, the controller will not allow movement of the truck or overpack unless the same radioactive source shields with the radioactive sources that were taken out initially are restored and validated by an authorized user. If there is any deviation from this process that is not entered and validated by an authorized user then an alarm is sent via wireless means to a global asset tracking system so that appropriate action can be taken.

Problems associated with such transportation may include: 1) theft or loss of vehicles and overpacks containing radioactive material; 2) theft or loss of radioactive material from vehicles and overpacks; 3) the loss of radioactive material due to violation of standard operating procedures; and 4) compliance with various government regulations regarding the transportation of radioactive materials.

It remains desirable to provide improvements in efficiency, flexibility, reliability, and maintainability of the transportation of radioactive sources.

SUMMARY OF THE INVENTION

A method of tracking radioactive source shields loaded with radioactive sources comprises: attaching at least one RFID tag to a radioactive source shield; placing the radioactive source in a radioactive source shield at a base location; detecting identification information from the at least one RFID tag in the radioactive source shield at the base location; sensing a first gamma radiation count from the radioactive source in the radioactive source shield at the base location; storing the identification information and the first gamma radiation count; transporting the radioactive source in the radioactive source shield to a job location and removing the radioactive source from the radioactive source shield; and at the job location, checking that the radioactive source has been returned to the radioactive source shield by comparing any newly detected identification information with the stored identification information, and by comparing a sensed second gamma radiation count with the first gamma radiation count.

A method of tracking radioactive sources shields loaded with radioactive sources comprises: An asset tracking software that can be used by all authorized user to decode the information sent by the radioactive tracking equipment and present it in such a way that UserID, RFID information of all radioactive source shields, Gamma counts and warnings and alarms can be easily interpreted and acted upon if needed.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The present disclosure relates to a system that will track gamma radiation sources transported by wireline vehicles and overpacks used in well drilling operations on land and offshore platforms. The system sounds an alarm in case of abnormal circumstances and sends a wireless alert to a server based system that is monitored continuously. The radioactive sources are deployed on a worldwide basis such that the system tracks them globally where wireless transmissions are allowed.

The system includes a hardware kit for trucks depending upon the radiation tracking storage compartment. The system also includes kits for a standard Drilling and Measurements overpacks and Wireline overpacks. The system has the ability to monitor the overall gamma count when the source is initially assigned to a truck or an overpack and compare with the count when the source is returned after a job.

Figure 1:
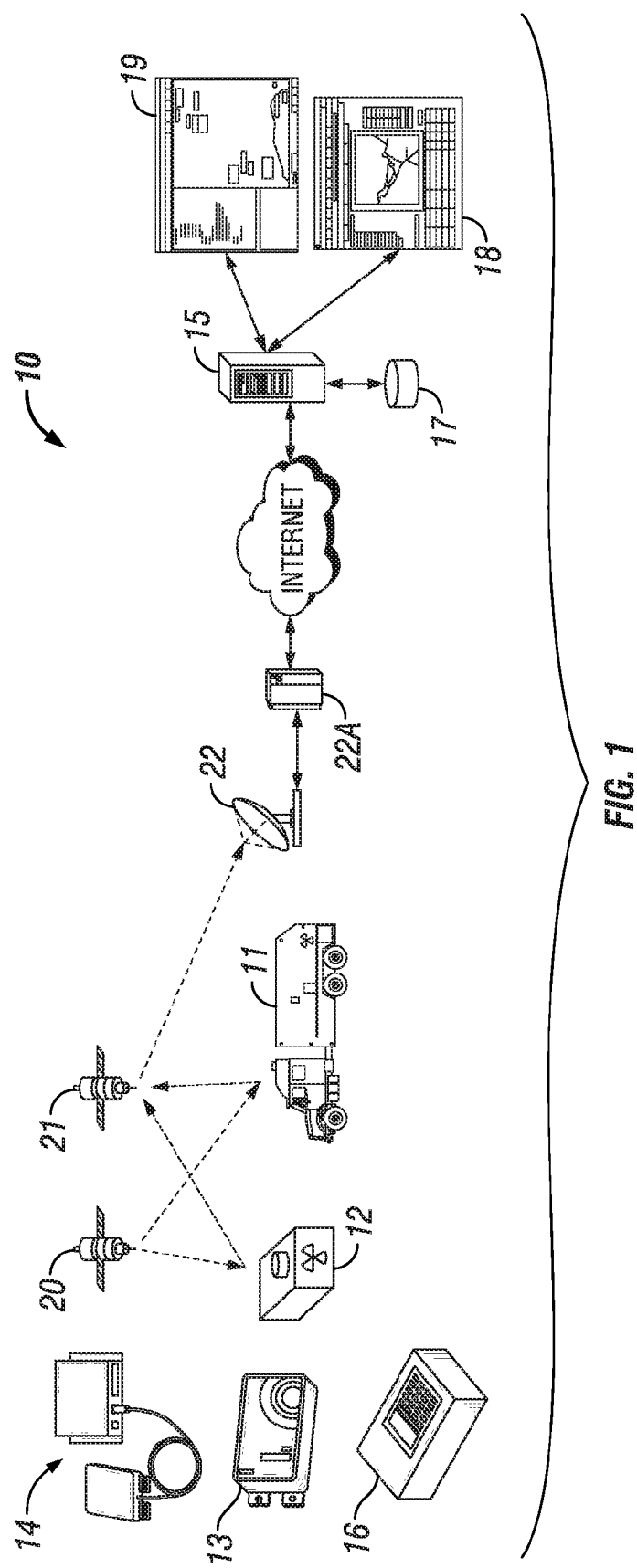
FIG. 1 is a schematic view of an embodiment of a Real Time Radioactive Tracking (RTRA) system.
Figure 2:
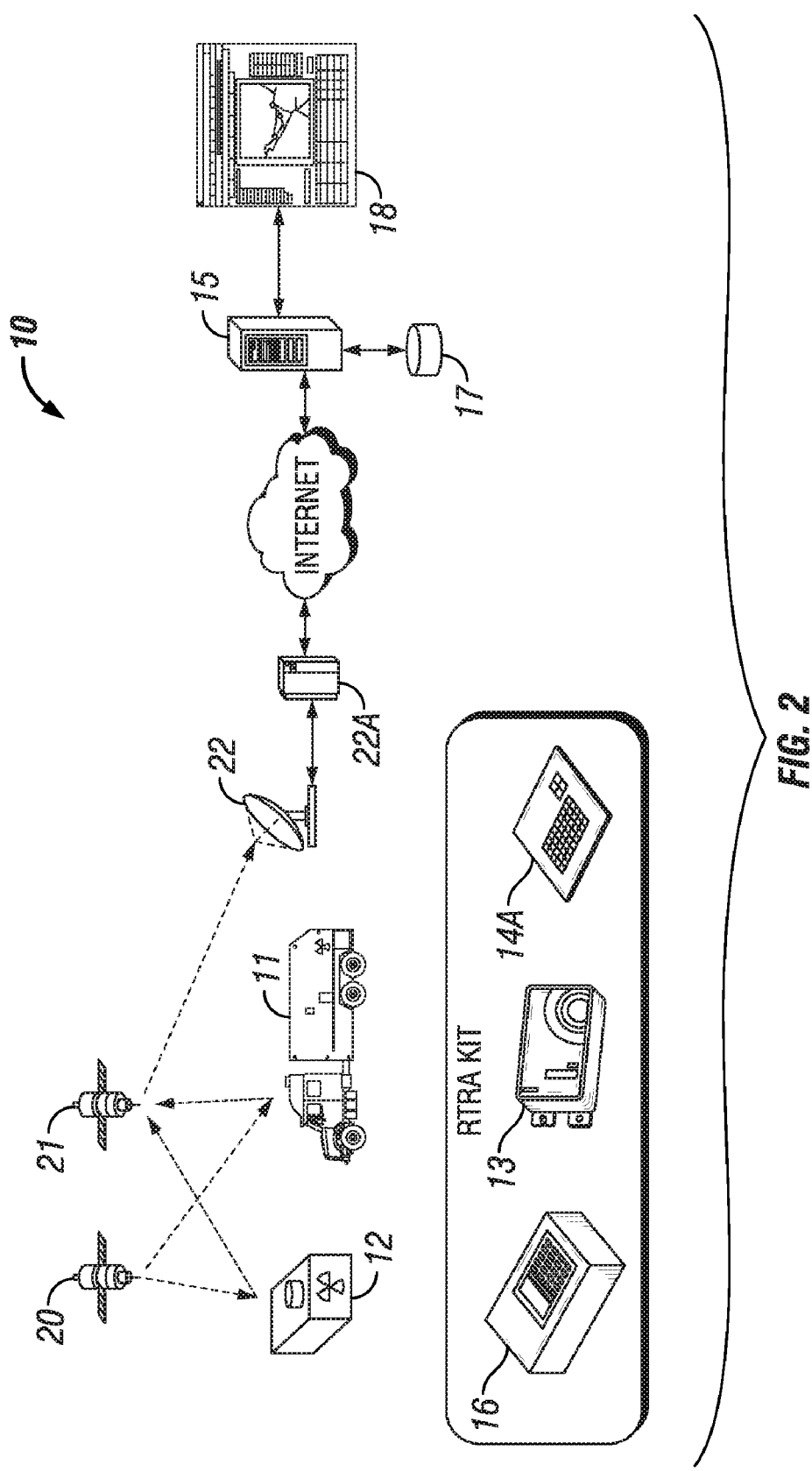
FIG. 2 is a view similar to FIG. 1 showing an enlarged web interface and an RTRA kit.

Referring now to FIGS. 1 and 2, there is shown an embodiment of a Real Time Radioactive Tracking (RTRA) system, indicated generally at 10. The RTRA system will track radioactive sources transported by wireline trucks 11 and overpacks 12. The sensor hardware 13 installed in the trucks consists of a system that uses RFID technology and gamma radiation sensors to detect the nuclear sources and shields. If an abnormal condition exists, the system 10 uses a wireless connection via cellular or satellite transceivers 14 to send an alarm message to an asset tracking software residing in a mobile operation server 15. If conditions are normal, only tracking messages are sent to the tracking software. There is a human interface (i.e., a keypad and an LCD in the TRX-Gamma box 16 that allows the user to configure the functionality. The transceiver 14 can be powered from any suitable power source such as batteries (not shown) or a solar cell 14a.

The use of the solar cell 14a advantageously allows the system 10 to operate in a stand-alone mode or configuration for months at a time without requiring an external power source.

The asset tracking software receives all the messages from the trucks 11 or overpacks 12 and is able to store the information in a database 17 and display it in text reports and map format. The tracking software is accessible through a web browser interface 18 or other suitable applications 19 so it can be used anywhere by properly authenticated users. The tracking software is able to receive and forward correctly an alarm in the form of an email to the appropriate user. The RTRA system 10 is designed to be deployed globally and thus is rugged and can endure extreme environmental conditions. The RTRA system utilizes global coverage in the form of a GPS satellite 20, multimodal wireless telecom (communications satellite and/or cellular) 21 and associated ground station 22, and gamma sensor/RFID tracking of radiation shields and nuclear compartment security switches.

The RTRA system 10 applies two sensor technologies; gamma count and RFID to track nuclear sources inside their shields. The RTRA system incorporates user defined criteria to detect abnormal conditions with the nuclear sources it tracks and generates an alarm through the tracking software to alert authorized persons. The RTRA system detects individual nuclear sources by measuring individual contribution of gamma counts for each source. The RTRA system can be set to RF safe mode to comply with Radio Frequency Silence conditions.

The sensor hardware 13 includes a gamma radiation sensor that can be an RAD-CZT sensor. During operation, the sensor hardware 13 comprising the RAD-CZT sensor advantageously consumes a low amount of electrical power as compared to other commercially available radiation sensors, which allows the sensor hardware 13 to be powered and operated by the solar cell 14a, as will be appreciated by those skilled in the art. Source detection is performed by placing up to three radiation sources in the transport compartment and reading the gamma count. Once this value is read into the system during the assign stage, it will be compared to future values when the sources are returned to the compartment. The sensor hardware 13 also includes RFID tags and an RFID reader. The tag may be a Confidex Ironside™ RFID tag available from Confidex Americas of Apex, N.C. The reader may be a SkyeModule M9 RFID reader available from SkyeTek of Westminster, Colo.

The Real Time Radiation Tracking system 10 provides a system to track radioactive sources using GPS, wireless media and tracking software. The system may advantageously 1) mitigate the effect of theft/loss of vehicles/overpacks containing radioactive material; 2) mitigate the effect of theft or loss of radioactive material from vehicles/overpacks; 3) reduce the probability of loss of radioactive material due to violation of standard operating procedures; and 4) provide technology foundation that enables compliance with different regulations.

The transceiver 14 may be, for example, a SureLinx™ 8100 D+/GPRS integrated wireless controller available from SkyWave Mobile Communications, Inc. of Ottawa, Ontario, Calif. This controller provides wireless communication over GPRS and D+ satellite network. It works with a Skywave Versa gateway 22a which is used by the iDistrict Mobile Operation.

There may be two types of user interfaces; one for the standard user and one for the system administrator at each district. The standard user interface 18 displays a map with the source(s), vehicle tracking and report functionality. The administrator interface 19 allows adding/removing/editing sources and users, and changing alarm recipients.

Figure 3:
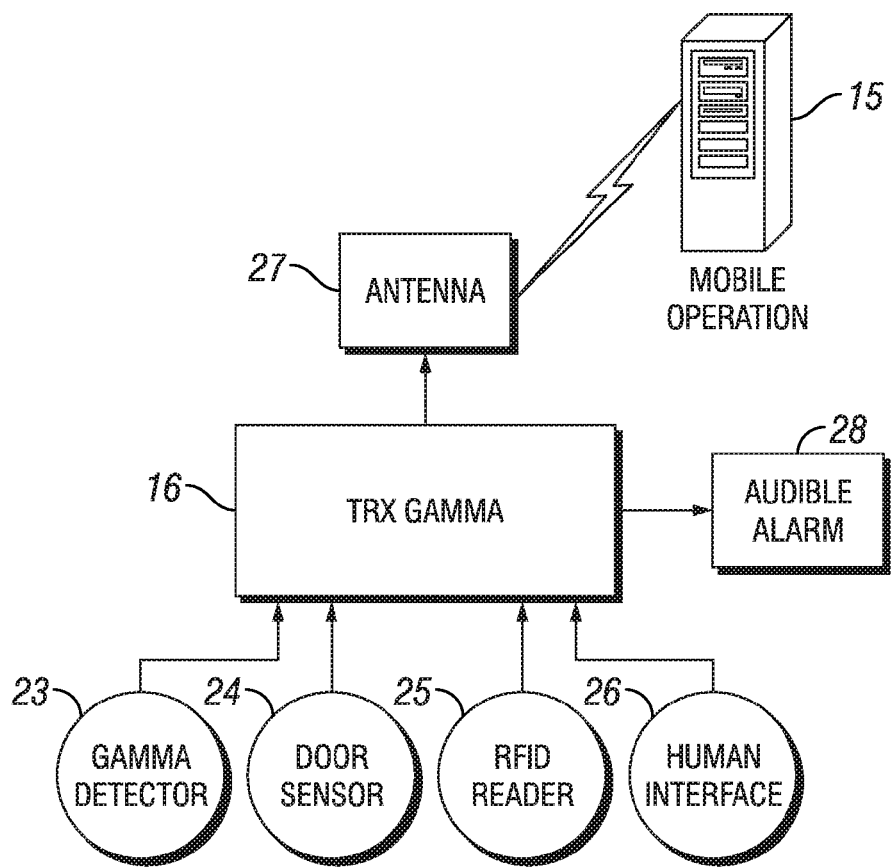
FIG. 3 is a block diagram view of the TRX-Gamma hardware shown in FIGS. 1 and 2.

As shown in FIG. 3, the TRX-Gamma box 16 has inputs connected to a gamma sensor 23, a door sensor 24, and an RFID sensor 25 for receiving input signals. The TRX-Gamma box 16 communicates with a human interface 26 for a user. An antenna 27 is connected for receiving the GPS signal from the GPS satellite 20 and transmitting to the communications satellite 21. The TRX-Gamma box 16 also is connected to an audible alarm 28 for generating alarm signals.

Figure 4:
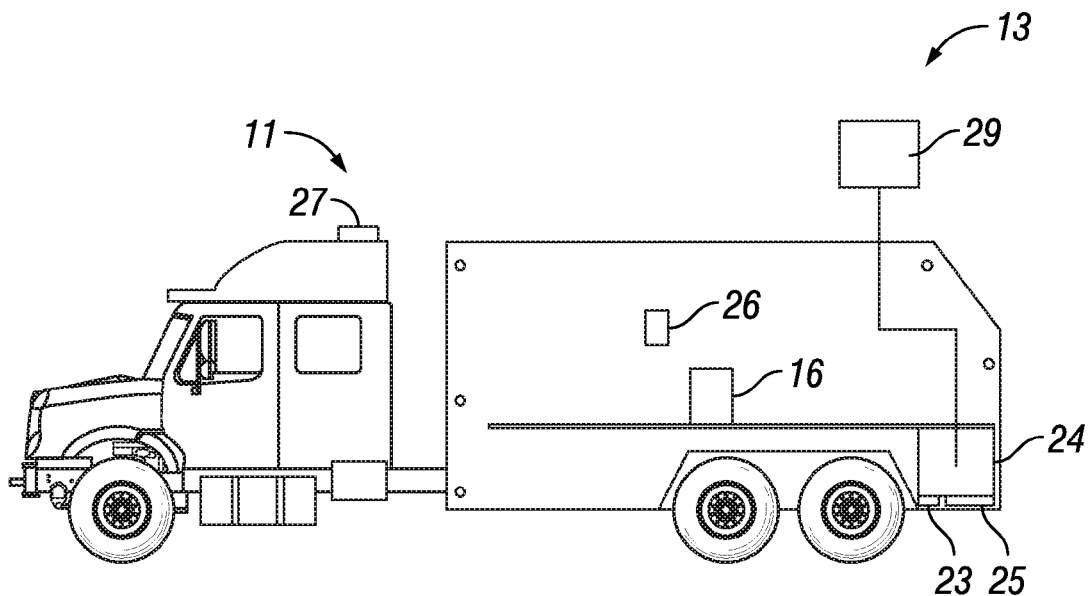
FIG. 4 is a schematic view of the wireline truck shown in FIGS. 1 and 2.

As shown in FIG. 4, the TRX-Gamma box 16, the gamma sensor 23, the door sensor 24, the RFID sensor 25, the user interface 26, and the antenna 27 are mounted on the wireline truck 11. These components are used to monitor a radioactive source shield 29 having an associated RFID tag.

Figure 5:
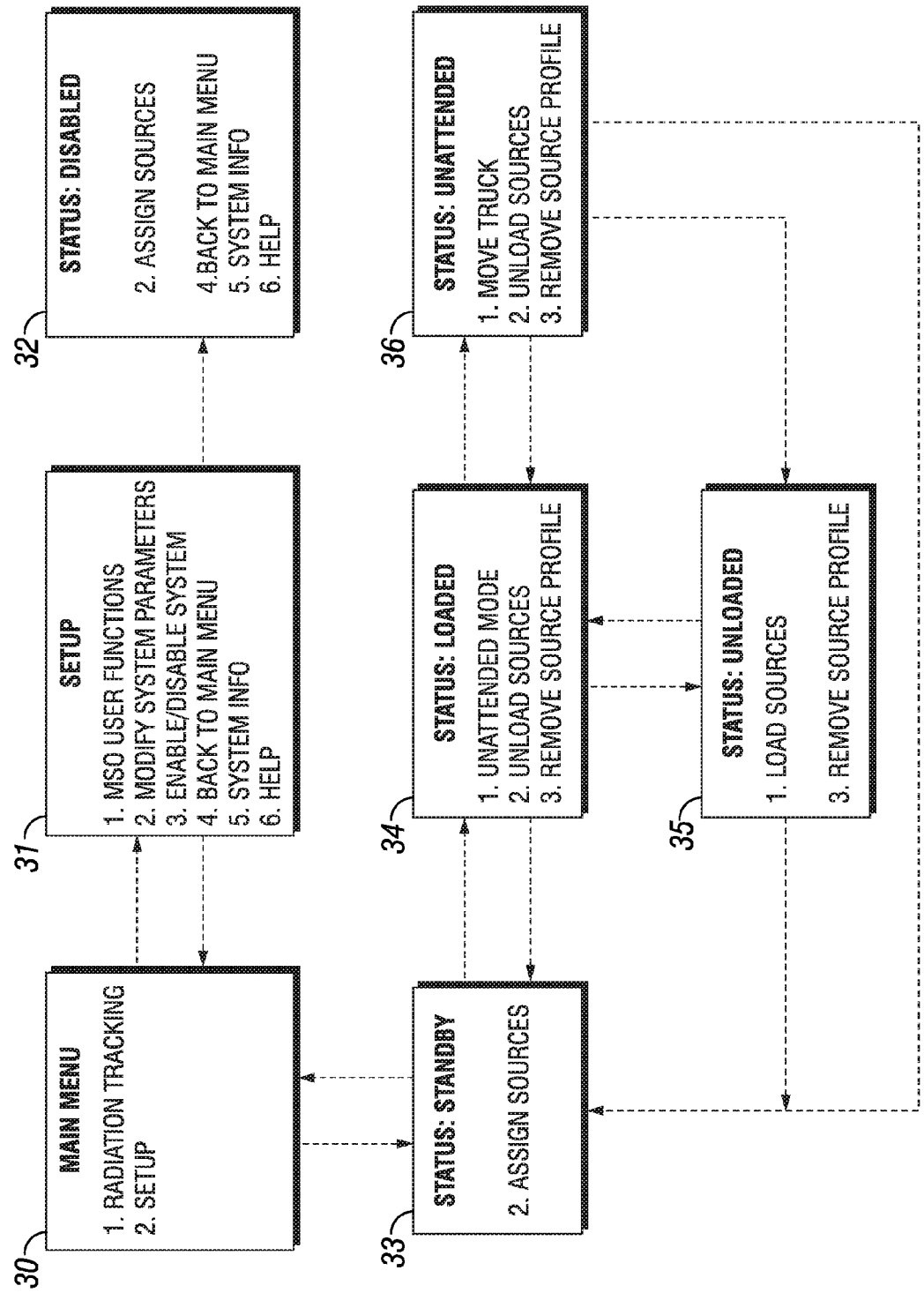
FIG. 5 is a block flow diagram of the operational modes of the RTRA system.
Figure 6A:
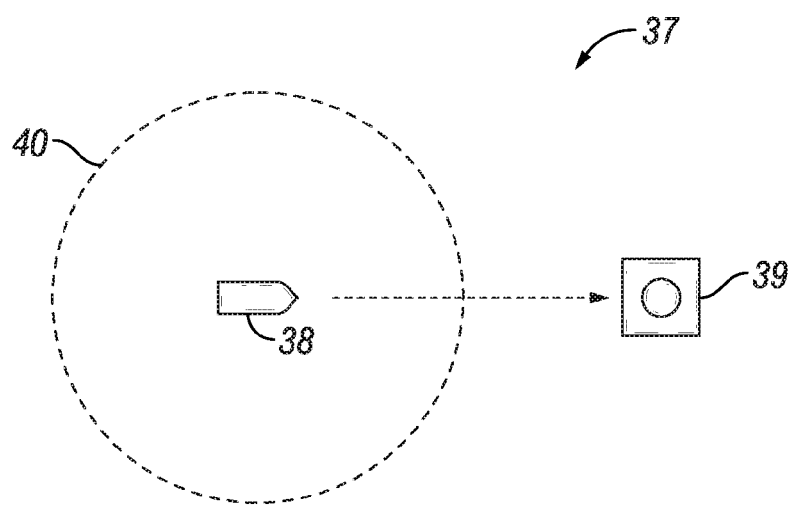
FIG. 6 is a schematic diagram of the Offshore Transport RF safe mode of the RTRA system.
Figure 6B:
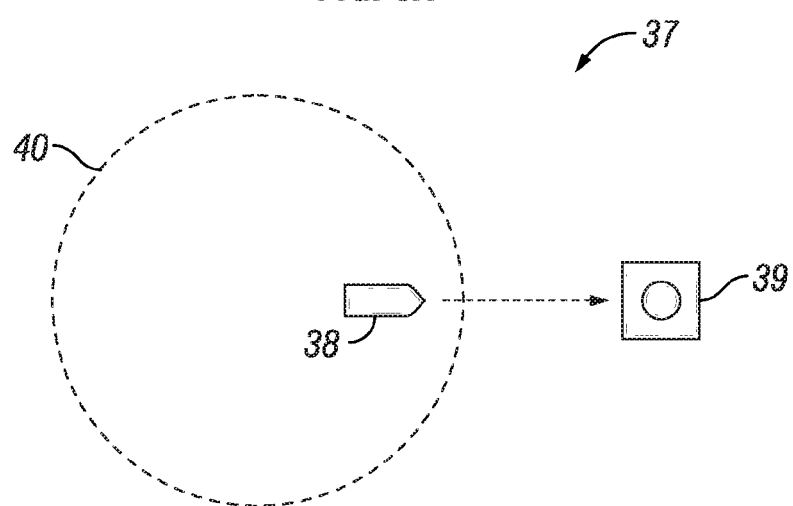
Figure 6C:
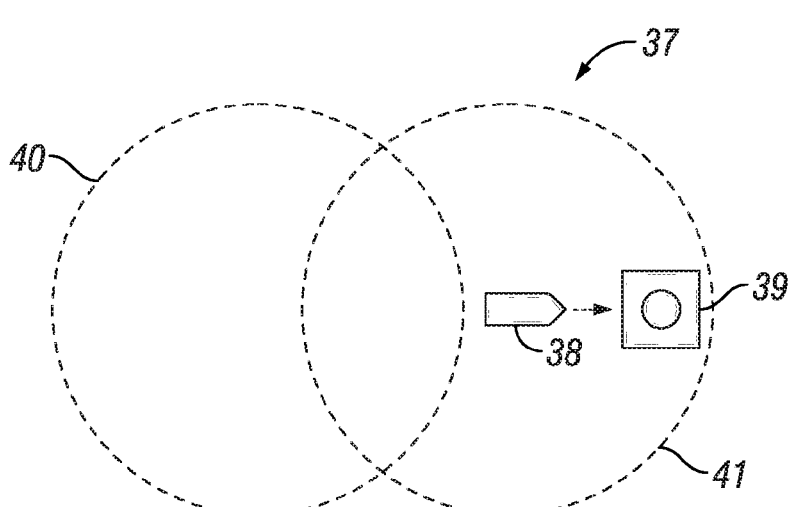

The system 10 may operate in a plurality of modes comprising a Standby Mode, Loaded Mode, Unloaded Mode, Unattended Mode, Disabled Mode, Standard RF Safe Mode, and Offshore Transport RF Safe Mode. The RTRA system operational modes are shown in FIGS. 5 and 6. As shown in FIG. 5, the RTRA system software displays a Main Menu 30 permitting the selection of a Radiation Tracking routine or a Setup routine. Selection of Setup leads to the Setup routine 31 having an option of entering a Status: Disabled routine 32 for the Disabled Mode.

The system 10 may be in the Standby Mode 33 when there are no radiation sources inside the truck 11 or overpack 12. The term "container" is used both for the truck 11 having a radioactive source storage compartment and the overpack 12. The system has satellite communication active. The system tracks where the container is located to assist in case of theft or basic tracking purposes. Options for the Standby Mode 33 may comprise loading sources into the container to start the radiation tracking and activate radiation alarms. Alarms may be triggered in the Standby Mode 33 when the system has moved for a predetermined distance such as one kilometer and detects source shields and gamma counts that have not been assigned to the container, which prevents sources not being tracked if the user does not assign them to the container.

The system 10 may be in the Loaded Mode 34 when sources have been placed and assigned to the container. In this mode, the system has satellite communication active to track the sources. Gamma, RFID and door alarms are active. Options for the Loaded Mode 34 may comprise unloading the sources for use during a job without triggering an alarm, which may ensure that the sources are being taken out of the container by approved personnel, and locking the system when unattended, which may be done when the container is loaded with sources and it may be left at a place where there is at risk of theft. Alarms may be triggered in the Loaded Mode 34 when a door is opened without entering the correct key code (such as in a wireline truck 11), the shields are taken out of the container (such as a shield RFID not detected), and gamma counts are outside of an assigned range (such as a source missing).

The system 10 may be in the Unloaded Mode 35 when the sources have been taken out of the container by an approved user (i.e. an engineer may unload the sources on location to perform a job). The sources profile is still recorded in the system and the container may not be allowed to move without the sources. Options for the Unloaded Mode 35 may comprise loading the sources back into the container (i.e. the job has been completed and the container may be moved) and removing the source profile from the system (i.e. the sources are taken out of the container for storage). Alarms may be triggered in the Unloaded Mode 35 when the container is moved a predetermined distance, such as 100 m, from the position where the sources were unloaded, which ensures that the sources are not left behind.

The system 10 may be in the Unattended Mode 36 when the container is loaded with sources and should not move from its current location. Options for the Unattended Mode 36 may comprise allowing the container to move again, removing sources from the container, and removing the source profile from the system 10. Alarms may be triggered when the container is moved, when the door is opened without entering the correct key code (such as in a wireline truck 11), when the shields are taken out of the container, and when the gamma counts are outside of an assigned range.

The Disabled Mode 32 removes all tracking and radiation detection functionality from the system 10. Satellite communication is also disabled.

The system 10 has the option to be in a Standard RF Safe mode when located in an RF safe zone (i.e., a perforating job). No cellular or satellite transmission will be conducted until the system is taken out of the RF safe mode, or the container moves 1 km away.

When in the Offshore Transport RF Safe mode 37 (such as in an area where RF transmissions are required to be limited), the system 10 will only transmit if it has moved a predetermined distance from its last known position. The default radius may be one mile and it can be changed or configured. During the Offshore Transport RF Safe mode 37, as shown in FIG. 6, the container on a boat 38 may be tracked from a base to ~1 mile from the rig 39 in 1 mile increments. At position P1 of the boat 38, the system transmits and establishes a "Geofence" 40 having a one mile radius. At position P2, the boat 38 has moved toward the rig 39, but is still located within the "Geofence" 40 so that no transmission is made. At position P3, the boat 38 has moved outside the "Geofence" 40 and the system makes a final transmission within a radius of one mile from the rig 39 as the boat makes the final approach to the rig. A new "Geofence" 41 is established and no standard messages may be transmitted while at the rig 39. However, the radiation loss alarm event may be transmitted regardless of position. In this manner, the system and the associated radioactive source may be tracked all the way back from the rig 39 to the base in ~1 mile increments, and at the base, personnel may have to set the system back to normal mode so all the queued messages can be transmitted.

There are three types of messages that the system 10 sends: Position, Data poll #1 and Data poll #2. The Position message may contain information related to the position of the unit and what state it is currently in. For example, this information can include a time stamp, latitude and longitude, speed and direction. This message may be sent every time the unit moves and/or every 24 hours to give a system update. The Data poll #1 message may contain the information related to the RFID identifiers that specify what sources are carried in the container. This message may be sent every time the user changes the system state and/or when the system moved. The Data poll #2 message may contain information about the user (for example, a user identification number) who last interacted with the system and also if there are any alarms. This message may be sent every time the user changes the system state.

In order to mitigate the risk of loss of sources, a firmware based source discrimination algorithm may be implemented as follows. Sources are taken out of storage and placed in the source compartment/overpack. At the RTRA terminal, a user or users may assign the sources and may enter how many sources should be expected. The RTRA system 10 may read the total gamma counts and look for as many distinct source RFID identifiers as the user specified. If all tags are found and gamma is greater than 200 cpm, the system may store in non-volatile memory the baseline gamma count reading and the RFID tags specific to the sources that were assigned to the truck and the system may change to the Loaded Mode 34. If gamma counts are below 200 cpm, an error may be displayed and system may not go to the Loaded Mode 34. If not all the tags specified by the user are detected, the system may display a warning and may not go to the Loaded Mode 34.

Before a job, the system 10 may be switched by the user to Unloaded Mode 35. After a job, the sources are returned to the truck 11. The user may select from the terminal the "return sources to truck/overpack" option. The system may check for gamma counts. The expected value is the baseline gamma counts +/−10% for gamma values greater than 1000 cpm and +/−25% for values less than 1000 cpm (i.e. D&M overpacks or only one WL gamma source in a truck compartment). The system may also check for the presence of the same RFID tag identifiers that were originally assigned to the unit. If gamma count is in range and all RFID tags are detected, the system may go to the Loaded Mode 34. If gamma count is out of range, a warning may be displayed requesting the user to perform a manual source inspection. The system may stay in the Unloaded Mode 35. If one or more RFID are not detected, a warning may be displayed noting which RFID tags were not detected. The system 10 will stay in the Unloaded Mode 35.

There system 10 may utilize two types of user interfaces: One for the standard user and one for the system administrator at each district. The standard user interface 18 may contain the map with the units, vehicle tracking and report functionality and the administrator user interface 19 may allow adding/removing units, users and changing alarm recipients.

The RTRA web interface may be a browser based interface that positions the assets according to their coordinates (Lat/Long) in a map and renders it in real time. The RTRA web interface should be available through a web browser. It should not depend or require any software to be installed on the client computer. The web interface may show a map and all messages with all the vehicles that have sent polls within the last 24 hours.

The standard user interface may provide the following functionality: a main map with the location of all vehicles for the district and their last reported position; the ability to track a single unit position; and the gamma information for a user selectable timeframe. The reports that can be generated may be, but are not limited to:

Number or alarms/warnings per unit

Number or alarms/warnings per user

Break down of alarms/warnings by type

List of sources used in last X days

Report of last known position of all sources

Last X positions for a given source

The system 10 may be advantageously utilized in a land configuration as well as an offshore configuration, as will be appreciated by those skilled in the art. The system provides a modular design that may be utilized with, for example, a plurality of overpacks 12 and Wireline trucks 11.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A method of tracking radioactive sources, comprising:
    attaching at least one RFID tag to a radioactive source shield;
    placing a radioactive source in the radioactive source shield at a base location;
    detecting identification information from the at least one RFID tag in the shield at the base location;
    sensing a first gamma radiation count from the radioactive source in the shield at the base location;
    storing the identification information and the first gamma radiation count;
    transporting the radioactive source shield to a job location and removing the radioactive source from the shield; and
    at the job location, checking that the radioactive source has been returned to the shield by comparing any newly detected identification information with the stored identification information, and by comparing a sensed second gamma radiation count with the first gamma radiation count.

2. The method according to claim 1, including transmitting position information during the transport of the shield to the job location, the transmitting being at least one of from predetermined locations of the shield and predetermined times.

3. The method according to claim 1, including transmitting position information from a location of the shield during the transport to the job location, establishing a Geofence around the location and not transmitting again until the shield has moved beyond the Geofence.

4. The method according to claim 1 including generating a real time display indicating an actual position of the shield.

5. The method according to claim 1, including transmitting position information from the shield including at least one of a time stamp, latitude and longitude, speed and direction.

6. The method according to claim 5, including transmitting the position information at least one of every time the shield moves and every 24 hours.

7. The method according to claim 1, including transmitting from the shield a data poll #1 message that contains the identification information related to the RFID tag.

8. The method according to claim 1, including transmitting from the shield a data poll #2 message that contains at least one of information about a user who last interacted with the shield and if there are any alarms.

9. The method according to claim 1, including a TRX-Gamma box attached to the shield, the box including an interface for permitting a user to select a mode of operation from at least one of a Standby Mode, a Loaded Mode, an Unloaded Mode, an Unattended Mode, a Disabled Mode, a Standard RF Safe Mode, and an Offshore Transport RF Safe Mode.

10. The method according to claim 1, including wirelessly transmitting information related to the radioactive source and the shield via satellite to a server and storing the transmitted information in a database.

11. The method according to claim 10, including obtaining a position of the shield from a GPS satellite and including the position in the transmitted information.

12. The method according to claim 1, wherein the radioactive source includes at least two separate radioactive sources.

13. The method according to claim 4, wherein generating comprises generating a real time display via a web browser interface.

14. The method according to claim 13, further comprising generating an electronic alarm in an alarm condition.

15. A system for tracking radioactive sources, comprising:
    a radioactive source shield for storing a radioactive source;
    an RFID tag attached to the radioactive source shield;
    a TRX-Gamma box housing a gamma radiation sensor for sensing a gamma radiation count of the source and an RFID reader for detecting identification information from the RFID tag;
    a server; and
    a wireless transceiver connected to the sensor and the reader for receiving position information from a GPS satellite and for transmitting the position information, the gamma radiation count and the identification information to the server.

16. The system according to claim 15, wherein the shield is one of an overpack and a truck.

17. The system according to claim 15, wherein the TRX-Gamma box establishes a Geofence at a predetermined location of the shield and prevents the transceiver from transmitting until the shield is moved outside the Geofence.

18. The system according to claim 15, wherein the transceiver communicates with the server through a telecom apparatus including a communications satellite.

19. The system according to claim 15, wherein the shield is a truck and the TRX-Gamma box is connected to a door sensor for sensing a position of a door to a storage compartment for the radioactive source.

20. The system according to claim 15, wherein the TRX-Gamma box includes an interface for permitting a user to select a mode of operation from at least one of a Standby Mode, a Loaded Mode, an Unloaded Mode, an Unattended Mode, a Disabled Mode, a Standard RF Safe Mode, and an Offshore Transport RF Safe Mode.

21. The system according to claim 15, wherein the TRX-Gamma box is connected to an audible alarm for generating an alarm signal.

22. A kit for use in tracking radioactive sources, comprising:
    an RFID tag for attachment to a radioactive source shield;
    a TRX-Gamma box housing a gamma radiation sensor for sensing a gamma radiation count of the source and an RFID reader for detecting identification information from the RFID tag; and
    a wireless transceiver connected to the sensor and the reader for receiving position information from a GPS satellite and for transmitting the position information, the gamma radiation count and the identification information to a remote location.

* * * * *